United States Patent
Kakishita et al.

(10) Patent No.: US 12,305,068 B2
(45) Date of Patent: May 20, 2025

(54) DISPERSION LIQUID, INK COMPOSITION FOR INK JET RECORDING, AND DISPERSION RESIN

(71) Applicant: Seiko Epson Corporation, Tokyo (JP)

(72) Inventors: Hajime Kakishita, Shiojiri (JP); Mami Tojino, Shiojiri (JP); Toshihiro Otake, Chino (JP); Koichi Terao, Suwa (JP); Hiroshi Ito, Matsumoto (JP); Koji Horiba, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 757 days.

(21) Appl. No.: 17/546,154

(22) Filed: Dec. 9, 2021

(65) Prior Publication Data

US 2022/0186062 A1    Jun. 16, 2022

(30) Foreign Application Priority Data

Dec. 10, 2020 (JP) ................. 2020-205085

(51) Int. Cl.

| | | |
|---|---|---|
| C09D 17/00 | (2006.01) | |
| C08F 212/08 | (2006.01) | |
| C08F 220/06 | (2006.01) | |
| C08F 220/18 | (2006.01) | |
| C08F 220/20 | (2006.01) | |
| C08F 220/58 | (2006.01) | |
| C08K 5/42 | (2006.01) | |
| C09D 11/033 | (2014.01) | |
| C09D 11/326 | (2014.01) | |
| C09D 11/38 | (2014.01) | |

(52) U.S. Cl.
CPC .......... *C09D 17/001* (2013.01); *C08F 212/08* (2013.01); *C08F 220/06* (2013.01); *C08F 220/1804* (2020.02); *C08F 220/20* (2013.01); *C08F 220/585* (2020.02); *C08K 5/42* (2013.01); *C09D 11/033* (2013.01); *C09D 11/326* (2013.01); *C09D 11/38* (2013.01); *C09D 17/005* (2013.01)

(58) Field of Classification Search
CPC  C08F 212/08; C08F 220/1804; C08F 220/06; C08K 5/42; C09D 11/326
See application file for complete search history.

(56) References Cited

U.S. PATENT DOCUMENTS

| | | |
|---|---|---|
| 5,231,131 A | 7/1993 | Chu et al. |
| 5,708,095 A | 1/1998 | Grezzo Page et al. |
| 5,969,033 A | 10/1999 | Pearlstine |
| 6,660,793 B1 | 12/2003 | McIntyre et al. |
| 7,332,532 B2 | 2/2008 | Vasudevan |
| 10,717,292 B2 | 7/2020 | Sato et al. |
| 2005/0153123 A1 | 7/2005 | Herfert et al. |
| 2005/0228071 A1 | 10/2005 | Vasudevan |
| 2010/0204382 A1 | 8/2010 | Evstatieva et al. |
| 2011/0288209 A1* | 11/2011 | Beck .............. C08K 5/3437 524/90 |
| 2012/0287201 A1 | 11/2012 | Lozman et al. |
| 2014/0066352 A1 | 3/2014 | Wang et al. |
| 2014/0275460 A1 | 9/2014 | Tamareselvy et al. |
| 2019/0177561 A1 | 6/2019 | Koyanagi et al. |
| 2019/0309180 A1 | 10/2019 | Tanaka et al. |
| 2021/0292586 A1 | 9/2021 | Nagano et al. |

FOREIGN PATENT DOCUMENTS

| | | | |
|---|---|---|---|
| EP | 1707606 A1 * | 4/2006 | ............. C09D 11/00 |
| JP | H10-502097 A | 2/1998 | |
| JP | H10-087754 A | 4/1998 | |
| JP | H11-246808 A | 9/1999 | |
| JP | 2000273373 A | 10/2000 | |
| JP | 2002-020678 A | 1/2002 | |
| JP | 2005-298826 A | 10/2005 | |
| JP | 2010-090191 A | 4/2010 | |
| JP | 2010-229417 A | 10/2010 | |
| JP | 2010-540761 A | 12/2010 | |
| JP | 2012-167222 A | 9/2012 | |
| JP | 2014-025067 A | 2/2014 | |
| JP | 2014-534997 A | 12/2014 | |
| JP | 2015-083684 A | 4/2015 | |
| JP | 2015-533860 A | 11/2015 | |
| JP | 2016-190916 A | 11/2016 | |
| JP | 2017-002096 A | 1/2017 | |
| JP | 2017-048361 A | 3/2017 | |
| JP | 2017-075302 A | 4/2017 | |
| JP | 2019-026741 A | 2/2019 | |

(Continued)

OTHER PUBLICATIONS

"Methacrylates." NOF Europe, nofeurope.com/speciality-chemicals/specialty-monomers/methacrylates/. Accessed Aug. 25, 2023. (Year: 2023) 5 Pages.

*Primary Examiner* — Catherine S Branch
*Assistant Examiner* — Huihong Qiao
(74) *Attorney, Agent, or Firm* — Harness, Dickey & Pierce, P.L.C.

(57) ABSTRACT

A dispersion liquid includes water, a coloring material, a dispersion resin that disperses the coloring material, and a compound having s sulfonate group and a polymerizable group. The dispersion resin has a constituent unit A containing a hydrophobic monomer and a constituent unit B containing a monomer having a sulfonate group. The weight-average molecular weight of the dispersion resin is 5,000 to 100,000, and the molecular weight of the compound is 300 or less.

11 Claims, No Drawings

(56) References Cited

FOREIGN PATENT DOCUMENTS

| | | |
|---|---|---|
| JP | 2020-007570 A | 1/2020 |
| JP | 2020180210 A | 11/2020 |
| WO | 1994/021701 A1 | 9/1994 |
| WO | 2009-047233 A1 | 4/2009 |
| WO | 2013-067109 A1 | 5/2013 |
| WO | 2014-032267 A1 | 3/2014 |

* cited by examiner

DISPERSION LIQUID, INK COMPOSITION FOR INK JET RECORDING, AND DISPERSION RESIN

The present application is based on, and claims priority from JP Application Serial Number 2020-205085, filed Dec. 10, 2020, the disclosure of which is hereby incorporated by reference herein in its entirety.

BACKGROUND

1. Technical Field

The present disclosure relates to a dispersion liquid, an ink composition for ink jet recording, and a dispersion resin.

2. Related Art

An ink jet recording method can record high-definition images by a relatively simple apparatus and is rapidly developed in various fields. In particular, various investigations are performed for obtaining images with high quality while suppressing mist contamination of a recording head. For example, JP-A-2017-002096 discloses an ink for pigment ink jet recording, which contains pigment particles dispersed with a styrene-acrylic resin.

However, an ink composition containing a usual dispersant, such as a styrene-acrylic resin, described in JP-A-2017-002096 has a problem that when a coloring material is solidified by drying of an ink, subsequent re-dispersion becomes difficult, and thus a defect easily occurs when the ink is re-ejected after drying.

SUMMARY

According to an aspect of the present disclosure, a dispersion liquid includes water, a coloring material, a dispersion resin that disperses the coloring material, and a compound having a sulfonate group and a polymerizable group. The dispersion resin has a constituent unit A containing a hydrophobic monomer and a constituent unit B containing a monomer having a sulfonate group. The weight-average molecular weight of the dispersion resin is 5,000 to 100,000, and the molecular weight of the compound is 300 or less.

According to another aspect of the present disclosure, an ink composition for ink jet recording includes the dispersion liquid, a surfactant, and a water-soluble organic solvent.

DESCRIPTION OF EXEMPLARY EMBODIMENTS

An embodiment of the present disclosure (referred to as a "present embodiment" hereinafter) is described in detail below, but the present disclosure is not limited to this, and various modifications can be made within a range not deviating from the gist of the present disclosure.

1. Dispersion Liquid

A dispersion liquid according to the present embodiment includes water, a coloring material, a dispersion resin that disperses the coloring material, and a compound having a sulfonate group and a polymerizable group. The dispersion resin has a constituent unit A containing a hydrophobic monomer and a constituent unit B containing a monomer having a sulfonate group. The weight-average molecular weight of the dispersion resin is 5,000 to 100,000, and the molecular weight of the compound is 300 or less.

A dispersion liquid or ink composition using a usual dispersion resin has a problem that once a coloring material is solidified, re-dispersion is difficult. On the other hand, according to the present embodiment, the use of the dispersion resin having the configuration described above enables easy re-dispersion of the solidified coloring material, and also enables more improvements in ejection stability, re-ejection property (also referred to as "dry ejection characteristics" hereinafter) when an ink in a nozzle is dried, and wettability and viscosity. Each of the components is described in detail below.

1. 1. Dispersion Resin

The dispersion resin is a copolymer having the constituent unit A containing a hydrophobic monomer and the constituent unit B containing a monomer having a sulfonate group. In the present embodiment, the "monomer" represents a monomer having a polymerizable unsaturated bond before polymerization, and the "constituent unit" represents a repeating unit which constitutes a portion of the dispersion resin after polymerization. Also, in the present embodiment, the "hydrophobic" represents the property of being incompatible with water of 25° C., and the "hydrophilic" represents the property of being compatible with water of 25° C.

The dispersion resin may be either a random copolymer or a block copolymer. Examples of the block copolymer include a diblock copolymer having a block A composed of a constituent unit A and a block B composed of a constituent unit B; a diblock copolymer having a block A composed of a constituent unit A and a random block B/C composed of a constituent unit B and a constituent unit C; and the like. The use of such a dispersion resin tends to more improve re-dispersibility after solidification and to more improve ejection stability and dry ejection characteristics.

The content of the dispersion resin relative to the total amount of the dispersion liquid is preferably 2.0% to 14% by mass, more preferably 4.0% to 12% by mass, and still more preferably 6.0% to 10% by mass. When the content of the dispersion resin is within the range described above, there is a tendency to more improve re-dispersibility after solidification and to more improve ejection stability and dry ejection characteristics.

The content of the dispersion resin relative to 100 parts by mass of the coloring material is preferably 20 to 100 parts by mass, more preferably 30 to 80 parts by mass, and still more preferably 40 to 70 parts by mass. When the content of the dispersion resin is within the range described above, there is a tendency to more improve re-dispersibility after solidification and to more improve ejection stability and dry ejection characteristics.

1. 1. 1. Constituent Unit A

The constituent unit A is a constituent unit containing a hydrophobic monomer and partially imparts hydrophobicity to the dispersion resin. Although not particularly limited, the constituent unit A is aligned on the surface of the coloring material due to hydrophobic interaction and thus can contribute to adsorption of the dispersion resin to the coloring material.

Examples of the hydrophobic monomer constituting the constituent unit A include, but are not particularly limited to, vinyl monomers having an aromatic group, such as styrene, methylstyrene, other styrene derivatives, and the like; and acrylate ester monomers having a hydrocarbon group, such as methyl (meth)acrylate, ethyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, 2-ethylhexyl (meth)acrylate, benzyl (meth)acrylate, and the like. In the present embodiment, "(meth)acrylate" includes "acrylate" and "methacrylate". These hydrophobic monomers may be used alone or in combination of two or more.

In the present embodiment, "(meth)acrylate" includes "acrylate" and "methacrylate", and "(meth)acrylamide" includes "acrylamide" and "methacrylamide".

Among these, any one of vinyl monomers having an aromatic group, such as styrene and the like, and acrylate ester monomers having a hydrocarbon group, such as butyl acrylate and the like, is more preferably. The use of such a hydrophobic monomer tends to more improve the adsorptivity of the dispersion resin to the coloring material, to more improve re-dispersibility after solidification, and to more improve ejection stability and dry ejection characteristics.

The content of the constituent unit A relative to the total amount of the dispersion resin is preferably 10% to 90% by mass, more preferably 15% to 80% by mass, still more preferably 20% to 70% by mass, and even still more preferably 25% to 60% by mass. When the content of the constituent unit A is within the range described above, there is a tendency to more improve adsorptivity of the dispersion resin to the coloring material, to more improve re-dispersibility after solidification, and to more improve ejection stability and dry ejection characteristics.

1. 1. 2. Constituent Unit B

The constituent unit B is a monomer having a sulfonate group and partially imparts hydrophilicity to the dispersion resin. Although not particularly limited, the constituent unit B is aligned on the side opposite to the surface of the coloring material and thus can contribute to improvement in dispersibility. A single type or combination of two or more types of monomers having a sulfonate group may be used.

Examples of the monomer having a sulfonate group include, but are not particularly limited to, a vinyl monomer having a sulfonate group, a (meth)acrylamide monomer having a sulfonate group, and a (meth)acrylic monomer having a sulfonate group, and more preferred is at least one selected from the group consisting of a vinyl monomer having a sulfonate group, an acrylamide monomer having a sulfonate group, and an acrylic monomer having a sulfonate group. The use of such a monomer having a sulfonate group tends to more improve re-dispersibility after solidification, and to more improve ejection stability and dry ejection characteristics.

Examples of the vinyl monomer having a sulfonate group include, but are not particularly limited to, compounds represented by the following formula (1).

$$CH_2=CR^1-R^2-SO_3H \quad (1)$$

In the formula, $R^1$ represents a hydrogen atom or a methyl group, and $R^2$ represents a linear, branched, or cyclic alkyl group having 1 to 6 carbon atoms.

Examples of the (meth)acrylamide monomer having a sulfonate group include, but are not particularly limited to, compounds represented by the following formula (2).

$$CH=CR^3CONH-R^4-SO_3H \quad (2)$$

In the formula, $R^3$ represents a hydrogen atom or a methyl group, and $R^4$ represents a linear, branched, or cyclic alkyl group having 1 to 6 carbon atoms.

Examples of the (meth)acrylate monomer having a sulfonate group include, but are not particularly limited to, compounds represented by the following formula (3).

$$CH=CR^5COO-R^6-SO_3H \quad (3)$$

In the formula, $R^5$ represents a hydrogen atom or a methyl group, and $R^6$ represents a linear, branched, or cyclic alkyl group having 1 to 6 carbon atoms.

The sulfonate group in the monomer having a sulfonate group may form a salt. Examples of the salt include, but are not particularly limited to, alkali metal salts of potassium and the like; alkaline-earth metal salts of calcium, magnesium, and the like; an ammonium salt; and an alkylamine salt.

Among these, preferred is at least one selected from the group consisting of vinylsulfonic acid or salts thereof, allylsulfonic acid or salts thereof, methallylsulfonic acid or salts thereof, methacrylsulfonic acid or salts thereof, and 2-acrylamide-2-methylpropanesulfonic acid or salts thereof. The use of such a monomer having a sulfonate group tends to more improve re-dispersibility after solidification, and to more improve ejection stability and dry ejection characteristics.

The content of the constituent unit B relative to the total amount of the dispersion resin is preferably 3% to 70% by mass, more preferably 5% to 60% by mass, still more preferably 10% to 55% by mass, and even still more preferably 15% to 50% by mass. When the content of the constituent unit B is within the range described above, there is a tendency to more improve hydrophilicity of the dispersion resin, more improve re-dispersibility after solidification, and more decrease viscosity.

1. 1. 3. Constituent Unit C

The dispersion resin may further have a constituent unit C containing a hydrophilic monomer. Having the constituent unit C tends to more improve affinity for the coloring material and more improve re-dispersibility, dry ejection characteristics, and ejection stability.

Examples of the hydrophilic monomer constituting the constituent unit C include, but are not particularly limited to, acrylic acid monomers such as acrylic acid, methacrylic acid, and the like; and acrylate ester monomers such as 2-hydroxyethyl (meth)acrylate and the like. The hydrophilic acrylic acid monomers may be used alone or in combination of two or more. In the present embodiment, "(meth)acrylic acid" includes "acrylic acid" and "methacrylic acid".

Among these, preferably contained is at least one selected from the group consisting of acrylic acid, methacrylic acid, and 2-hydroxyethyl acrylate. The use of such a hydrophilic acrylic acid monomer tends to more improve adsorptivity of the dispersion resin to the coloring material, more improve re-dispersibility after solidification, and to more improve ejection stability and dry ejection characteristics.

The content of the constituent unit C relative to the total amount of the dispersion resin is preferably 3% by mass to 70% by mass, more preferably 5% by mass to 60 mol %, still more preferably 10% by mass to 55% by mass, and even still more preferably 15% by mass to 50% by mass. When the content of the constituent unit C is within the range described above, there is a tendency to more improve hydrophilicity of the dispersion resin, to more improve re-dispersibility after solidification, and to more improve ejection stability and dry ejection characteristics.

1. 1. 4. Weight-Average Molecular Weight and Molecular Weight Distribution

The weight-average molecular weight of the dispersion resin is 5,000 to 100,000, preferably 6,000 to 80,000, and more preferably 7,000 to 60,000. When the weight-average molecular weight of the dispersion resin is within the range described above, there is a tendency to more improve re-dispersibility after solidification and to more improve ejection stability and dry ejection characteristics.

The molecular weight distribution (Mw/Mn) of the dispersion resin is preferably 1.05 to 3.00, more preferably 1.05 to 2.00, still more preferably 1.10 to 1.80, and particularly preferably 1.20 to 1.60. When the molecular weight distribution of the dispersion resin is within the range described above, there is a tendency to provide a more uniform molecular size, to more improve re-dispersibility after solidification, and to more improve ejection stability and dry ejection characteristics. The relatively narrow molecular weight distribution can be achieved by living radical polymerization or the like described later.

The weight-average molecular weight and the molecular weight distribution can be measured by a known method using chromatography, and more specifically can be measured by a method described in examples.

1. 1. 5. Production Method

The dispersion resin according to the present embodiment can be produced by copolymerizing the hydrophobic monomer and the monomer having a sulfonate group, and if required, the hydrophilic monomer. The polymerization reaction is not particularly limited, but for example, radial polymerization, particularly living radical polymerization, can be used.

1. 2. Compound Having Sulfonate Group and Polymerizable Group

By containing the compound having a sulfonate group and a polymerizable group, wettability and ejection stability of the resultant ink composition are more improved, and viscosity is more decreased.

Examples of the compound having a sulfonate group and a polymerizable group include, but are not particularly limited to, a vinyl compound having a sulfonate group, a (meth)acrylamide compound having a sulfonate group, and a (meth)acrylic compound having a sulfonate group. Examples of these compounds include, but are not particularly limited to, compounds represented by the formula (1) to (3) described above. The compounds having a sulfonate group may be used alone or in combination of two or more.

The type of the monomer constituting the constituent unit B of the dispersion resin and the type of the compound having a sulfonate group and a polymerizable group, which is independently contained in the dispersion liquid, may be the same or different.

The molecular weight of the compound having a sulfonate group and a polymerizable group is 300 or less, preferably 100 to 300, and more preferably 100 to 250. When the molecular weight of the compound having a sulfonate group and a polymerizable group is within the range described above, wettability and ejection stability of the resultant ink composition are more improved, and viscosity is more decreased.

The content of the compound having a sulfonate group and a polymerizable group relative to the total amount of the dispersion liquid is preferably 100 to 50000 ppm, more preferably 200 to 10000 ppm, and still more preferably 300 to 5000 ppm. When the content of the compound having a sulfonate group and a polymerizable group is within the range described above, there is a tendency to more improve the wettability and ejection stability of the resultant ink composition and to more decrease the viscosity.

1. 3. Water

The content of water relative to the total amount of the dispersion liquid is preferably 60% to 90% by mass, more preferably 65% to 90% by mass, and still more preferably 70% to 85% by mass.

1. 4. Coloring Material

The coloring material is not particularly limited, but for example, a disperse dye or a pigment can be used. Among these, the disperse dye is preferred. The use of the disperse dye tends to more improve re-dispersibility after solidification and more improve ejection stability and dry ejection characteristics. These coloring materials may be used alone or in combination of two or more.

Usable examples of the disperse dye include, but are not particularly limited to, known dyes such as C. I. Disperse Yellow, C. I. Disperse Orange, C. I. Disperse Blue, C. I. Disperse Violet, C. I. Disperse Black, and the like.

Examples of an inorganic pigment include, but are not particularly limited to, carbon black (C. I. Pigment Black 7) such as furnace black, lamp black, acetylene black, channel black, and the like, iron oxide, and titanium oxide.

Examples of an organic pigment include, but are not particularly limited to, a quinacridone pigment, a quinacridone-quinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment.

The content of the coloring material relative to the total amount of the dispersion liquid is preferably 7.5% to 30% by mass, more preferably 7.5% to 25% by mass, and still more preferably 8.5% to 20% by mass.

1. 4. pH Adjuster

The dispersion liquid may further contain a pH adjuster. Examples of the pH adjuster include, but are not particularly limited to, inorganic acids (for example, sulfuric acid, hydrochloric acid, nitric acid, and the like), inorganic bases (for example, lithium hydroxide, sodium hydroxide, potassium hydroxide, ammonia, and the like), organic bases (for example, triethanolamine, diethanolamine, monoethanolamine, and tripropanolamine), organic acids (for example, adipic acid, citric acid, succinic acid, and the like), and the like. These pH adjusters may be used alone or in combination of two or more.

2. Ink Composition for Ink Jet Recording

An ink composition for ink jet recording (also simply referred to as an "ink composition") according to the present embodiment contains the dispersion liquid, a surfactant, and a water-soluble organic solvent and may, if required, contain other components. The expression "for ink jet recording" represents use by an ink jet method of ejecting ink droplets from nozzles of an ink jet head.

2. 1. Dispersion Liquid

The dispersion liquid is as described above. The content of the dispersion resin added together with the dispersion liquid to the ink composition, relative to the total amount of the ink composition, is preferably 0.1% to 3.5% by mass, more preferably 0.3% to 3.0% by mass, and still more preferably 0.5% to 2.5% by mass. When the content of the dispersion resin is within the range described above, there is a tendency to more improve re-dispersibility after solidification and more improve ejection stability and dry ejection characteristics.

The content of the coloring material added together with the dispersion liquid to the ink composition, relative to the total amount of the ink composition, is preferably 0.5% to 7.0% by mass, more preferably 1.0% to 6.0% by mass, and still more preferably 1.5% to 4.5% by mass. When the content of the coloring material is within the range described above, there is a tendency to more improve re-dispersibility after solidification and more improve ejection stability and dry ejection characteristics.

The content of the dispersion resin relative to 100 parts by mass of the coloring material in the ink composition is preferably 10 to 80 parts by mass, more preferably 15 to 70 parts by mass, and still more preferably 25 to 60 parts by mass. When the content of the dispersion resin is within the range described above, there is a tendency to more improve re-dispersibility after solidification and more improve ejection stability and dry ejection characteristics.

2. 2. Surfactant

Examples of the surfactant include, but are not particularly limited to, an acetylene glycol-based surfactant, a fluorine-based surfactant, and a silicone-based surfactant.

The acetylene glycol-based surfactant is not particularly limited, but is, for example, preferably one or more selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkylethylene oxide adducts, perfluoroalkylbetaine, and perfluoroalkylamine oxide compounds.

Examples of the silicone-based surfactant include a polysiloxane-based compound, polyether-modified organosiloxane, and the like.

The content of the surfactant relative to the total amount of the ink composition is preferably 0.1% to 3.0% by mass and more preferably 0.1% to 1.0% by mass.

2. 3. Water-Soluble Organic Solvent

Examples of the water-soluble organic solvent include, but are not particularly limited to, glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, and the like; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, triethylene glycol monobutyl ester, and the like; nitrogen-containing solvents such as 2-pyrrolidone, N-methyl-2-pyrrolidone, N-ethyl-2-pyrrolidone, and the like; and alcohols such as methanol, ethanol, n-propyl alcohol, iso-propyl alcohol, n-butanol, 2-butanol, tert-butanol, iso-butanol, n-pentanol, 2-pentanol, 3-pentanol, tert-pentanol, and the like. Among these, glycerin, glycols, and glycol monoethers are preferred, and diethylene glycol, propylene glycol, triethylene glycol monobutyl ether, and glycerin are more preferred. The water-soluble organic solvents may be used alone or in combination of two or more.

The content of the water-soluble organic solvent relative to the total amount of the ink composition is preferably 5.0% to 30% by mass and more preferably 10% to 20% by mass. When the content of the water-soluble organic solvent is within the range described above, there is a tendency to more improve re-dispersibility after solidification and more improve ejection stability and dry ejection characteristics.

2. 4. Water

The content of the water relative to the total amount of the ink composition is preferably 60% to 90% by mass and more preferably 70% to 85% by mass. When the content of the water is within the range described above, there is a tendency to more improve re-dispersibility after solidification and more improve ejection stability and dry ejection characteristics.

2. 5. pH Adjuster

The ink composition may further contain a pH adjuster. Examples of the pH adjuster include, but are not particularly limited to, the examples described for the dispersion liquid. The pH adjuster may be derived from the dispersion liquid and mixed in the ink composition or may be separately added when the ink composition is prepared.

The content of the pH adjuster relative to the total amount of the ink composition is preferably 0.1% to 2.0% by mass and more preferably 0.5% to 1.5% by mass.

2. 6. Other Resin

The ink composition may further contain a resin other than the dispersion resin. Examples of the other resin include, but are not limited to, an anionic resin, a cationic resin, and a nonionic resin. By containing such a resin, the coloring material can be fixed to a recording medium.

Examples of the cationic resin include, but are not particularly limited to, starch derivatives such as cation starch and the like, a cationic urethane resin, a cationic olefin resin, and a cationic allylamine-based resin.

Examples of the anionic resin include cellulose derivatives such as a carboxymethyl cellulose salt, viscose, and the like; and natural resins such as an alginate salt, gum arabic, gum traganth, a ligninsulfonate salt, and the like.

Examples of the nonionic resin include, but are not particularly limited to, an acrylic resin, a styrene-acrylic resin, a urethane-based resin, an ester-based resin, an olefinic resin, and a vinyl acetate-based resin.

The content of the other resin relative to the total amount of the ink composition is preferably 0.1% to 2.0% by mass and more preferably 0.5% to 1.5% by mass.

EXAMPLES

The present disclosure is described in further detail below by using examples and comparative examples. The present disclosure is not limited to the examples below.

1. Synthesis of Copolymer

1. 1. Synthesis Example 1

In a three-neck flask with a stirring bar and Dimroth condenser set thereto, 80 parts by mass of butyl acrylate, 10 parts by mass of acrylic acid, and 10 parts by mass of sodium methallylsulfonate were placed and dissolved in isopropyl alcohol. Also, in another glass bottle, 1 part by mass of azobisisobutyronitrile and 10 parts by mass of isopropyl alcohol were placed to prepare an initiator solution.

The solution in the three-neck flask was bubbled with nitrogen for 20 minutes, and then the initiator solution was added dropwise. Then, the resultant solution was heated to the reflux temperature in a nitrogen atmosphere, and polymerization reaction was performed for 8 hours. After the completion of the reaction, the reaction product was added dropwise to water, precipitating a white solid. The precipitated solid was recovered by suction filtration and dried under vacuum at 50° C. for 10 hours, producing a dispersion resin A.

1. 2. Synthesis Example 2

In a three-neck flask with a stirring bar and Dimroth condenser set thereto, 90 parts by mass of butyl acrylate, 5 parts by mass of acrylic acid, 5 parts by mass of sodium methallylsulfonate, and 1 part by mass of 2'-cyanobutan-2'-yl 4-chloro-3,5-dimethylpyrazole-1-carbodithioate were placed and dissolved in isopropyl alcohol. Also, in another glass bottle, 1 part by mass of azobisisobutyronitrile and 10 parts by mass of isopropyl alcohol were placed to prepare an initiator solution.

The solution in the three-neck flask was bubbled with nitrogen for 20 minutes, and then the initiator solution was added dropwise. Then, the resultant solution was heated to the reflux temperature in a nitrogen atmosphere, and polymerization reaction was performed for 8 hours. After the completion of the reaction, the reaction product was added dropwise to water, precipitating a white solid. The precipitated solid was recovered by suction filtration and dried under vacuum at 50° C. for 10 hours, producing a dispersion resin B.

1. 3. Synthesis Examples 3 to 10

Dispersion resins C to Z were synthesized by the same method as in Synthesis Example 2 except that the type and amount of the monomers used were changed so as to obtain dispersion resins shown in Table 1 below.

1. 4. Weight-Average Molecular Weight and Molecular Weight Distribution

The weight-average molecular weight and the molecular weight distribution (Mw/Mn) of each of the dispersion resins produced as described above were measured by chromatography. The conditions are shown below.
Measurement Conditions
 Apparatus name: HLC8320GPC (Tosoh Corporation)
 Guard column: TSKgel guarcolumn Super AWM-H
 Column: TSKgel Super AWM-H
 Colum temperature: 25° C.
 Eluent: 10 mmol/L lithium bromide dimethylacetamide solution
 Flow rate: 0.6 mL/min
 Detector: RI

TABLE 1

| Copolymer | | Constituent unit A (% by mass) | | Constituent unit B (% by mass) | | | | Constituent unit C (% by mass) | | | Mn | Mw | Mw/Mn |
|---|---|---|---|---|---|---|---|---|---|---|---|---|---|
| | | BA | St | MSA | ASA | VSA | ATBS | AA | MAA | HEA | | | |
| Synthesis Example 1 | A | 80 | | 10 | | | | 10 | | | 11010 | 27525 | 2.5 |
| Synthesis Example 2 | B | 90 | | 5 | | | | 5 | | | 17049 | 25573 | 1.5 |
| Synthesis Example 3 | C | 70 | | | 20 | | | | | 10 | 5742 | 7465 | 1.3 |
| Synthesis Example 4 | D | | 30 | 10 | | | | 60 | | | 28569 | 51425 | 1.8 |
| Synthesis Example 5 | E | 35 | | | 50 | | | | 15 | | 15378 | 23666 | 1.5 |
| Synthesis Example 6 | F | 20 | | 30 | | | | | 50 | | 13264 | 22549 | 1.7 |
| Synthesis Example 7 | G | | 10 | | 60 | | | | | 30 | 14893 | 21281 | 1.4 |
| Synthesis Example 8 | H | 40 | | | | 20 | | 40 | | | 35189 | 45746 | 1.3 |
| Synthesis Example 9 | I | 50 | | | | | 30 | 20 | | | 21689 | 32534 | 1.5 |
| Synthesis Example 10 | Z | 60 | | | | | | 40 | | | 20464 | 71624 | 3.5 |

BA: Butyl acrylate
St: Styrene
AA: Acrylic acid
MAA: Methacrylic acid
HEA: 2-Hydroxyethyl acrylate
MSA: Sodium methallylsulfonate
ASA: Sodium allylsulfonate
VSH: Vinylsulfonic acid
ATBS: 2-Acrylamide-2-methylpropanesulfonic acid

2. Preparation of Varnish Solution

In a 1 L eggplant-shaped flask with a stirring bar and Dimroth condenser set thereto, 10 parts by mass of copolymer and 70 parts by mass of pure water were added, heated to 80° C., and stirred. To the resultant mixture, was added triethanolamine until pH become 8.0, and then a compound having a sulfonate group and a polymerizable group, which is shown in Table 2, was added. Further, pure water was added so that the total was 100 parts by mass. Then, the resultant mixture was cooled to 25° C., preparing a varnish solution containing 10% by mass of the copolymer.

TABLE 2

| | | Varnish solution | | | | | | | | | | |
|---|---|---|---|---|---|---|---|---|---|---|---|---|
| | | 1 | 2 | 3 | 4 | 5 | 6 | 7 | 8 | 9 | A | B |
| Dispersion resin | Copolymer A | 10 | | | | | | | | | | |
| | Copolymer B | | 10 | | | | | | | | | |
| | Copolymer C | | | 10 | | | | | | | | 10 |
| | Copolymer D | | | | 10 | | | | | | | |
| | Copolymer E | | | | | 10 | | | | | | |
| | Copolymer F | | | | | | 10 | | | | | |
| | Copolymer G | | | | | | | 10 | | | | |
| | Copolymer H | | | | | | | | 10 | | | |
| | Copolymer I | | | | | | | | | 10 | | |
| | Copolymer Z | | | | | | | | | | 10 | |
| Alkali agent | Triethanolamine | Proper amount | Proper amount | Proper amount | Proper amount | Proper amount | Proper amount | Proper amount | Proper amount | Proper amount | Proper amount | Proper amount |

TABLE 2-continued

| | | Varnish solution | | | | | | | | | | |
|---|---|---|---|---|---|---|---|---|---|---|---|---|
| | | 1 | 2 | 3 | 4 | 5 | 6 | 7 | 8 | 9 | A | B |
| Compound added | MSA | 0.075 | | 0.038 | 0.489 | | 0.375 | 0.084 | | | | |
| | ASA | | 0.075 | | | 0.381 | | | | | | |
| | VSA | | | | | | | | 0.300 | | | |
| | ATBS | | | | | | | | | 0.265 | | |
| | Water | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |

3. Preparation of Dispersion Liquid

Added were 100 parts by mass of the varnish solution and 20 parts by mass of DISPERSE YELLOW 232, and the resultant mixture was sufficiently mixed by dispersion using a beads mill containing zirconia beads having a diameter of 0.3 mm, preparing a dispersion liquid containing 8.3% by mass of the copolymer and 16.7% by mass of the coloring material.

TABLE 3

| | | Dispersion liquid | | | | | | | | | | |
|---|---|---|---|---|---|---|---|---|---|---|---|---|
| | | 1 | 2 | 3 | 4 | 5 | 6 | 7 | 8 | 9 | A | B |
| Coloring material (DY232) | | 16.7 | 16.7 | 16.7 | 16.7 | 16.7 | 16.7 | 16.7 | 16.7 | 16.7 | 16.7 | 16.7 |
| Dispersion resin | Copolymer A | 8.3 | | | | | | | | | | |
| | Copolymer B | | 8.3 | | | | | | | | | |
| | Copolymer C | | | 8.3 | | | | | | | | 8.3 |
| | Copolymer D | | | | 8.3 | | | | | | | |
| | Copolymer E | | | | | 8.3 | | | | | | |
| | Copolymer F | | | | | | 8.3 | | | | | |
| | Copolymer G | | | | | | | 8.3 | | | | |
| | Copolymer H | | | | | | | | 8.3 | | | |
| | Copolymer I | | | | | | | | | 8.3 | | |
| | Copolymer Z | | | | | | | | | | 8.3 | |
| Alkali agent | Triethanolamine | Proper amount | Proper amount | Proper amount | Proper amount | Proper amount | Proper amount | Proper amount | Proper amount | Proper amount | Proper amount | Proper amount |
| Compound added | MSA | 0.063 | | 0.032 | 0.407 | | 0.313 | 0.070 | | | | |
| | ASA | | 0.063 | | | 0.318 | | | | | | |
| | VSA | | | | | | | | 0.250 | | | |
| | ATBS | | | | | | | | | 0.221 | | |
| | Water | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |

4. Preparation of Ink Composition

Each of the dispersion liquids was mixed with other components so as to obtain the compositions shown in Table 4, preparing ink compositions.

5. Evaluation

5. 1. Wettability

The surface tension of each of the ink compositions prepared as described above was measured by the Wilhelmy method using a surface tensiometer (manufactured by Kyowa Interface Science Co., Ltd., surface tensiometer CBVP-Z or the like) at a liquid temperature of 25° C. Wettability was evaluated based on the obtained values of surface tension.

Evaluation Criteria

A: Surface tension of 30 mN/m or less
B: Surface tension of over 30 mN/m and 45 mN/m or less
C: Surface tension of over 45 mN/m

5. 2. Viscosity

The viscosity of each of the ink compositions prepared as described above was measured by using rheometer PHYSICA MCR300 manufactured by Anton Paar Inc., and the viscosity was evaluated by the ratio $\eta 1/\eta 2$ of viscosity $\eta 1$ at a shear rate of 10 s$^{-1}$ to the viscosity $\eta 2$ at a shear rate of 1000 s$^{-1}$.

Evaluation Criteria

A: Viscosity ratio of 1.3 or less
B: Viscosity ratio of over 1.3 and 1.5 or less
C: Viscosity ratio of over 1.5

5. 3. Re-Dispersibility

Each of the ink compositions prepared as described above was dropped on a slide glass and then solidified by drying for 16 hours in a dryer of 40° C. Then, the slide glass was dipped in a sample bottle containing ink water, and the re-dispersion behavior of a solid was confirmed by visual observation. This operation was performed with attention so that the ink water was not stirred. The ink water represents not containing the coloring material and the dispersion resin shown in Table 2. The evaluation criteria of re-dispersibility are shown below.

Evaluation Criteria

A: The solid disappeared, and re-dispersion was observed.
B: The solid partially remained, but re-dispersion was observed.
C: The solid remained, and re-dispersion was not observed.

5. 4. Ejection Stability

An ink jet-system printer EM-930C (trade name, manufactured by Seiko Epson Corporation) was filled with an ink composition for ink jet recording, and printing was continuously performed for 2 hours. A nozzle check pattern of nozzles used for printing was printed before and after printing to confirm the nozzles causing a deteriorating deviation of landing positions. In this case, the number of the nozzles was 180. The evaluation criteria are as follows. The evaluation result "A" or "B" can be determined as "good".

Evaluation Criteria

A: The number of nozzles with a deteriorating deviation of the landing positions was 1% or less.
B: The number of nozzles with a deteriorating deviation of the landing positions was over 1% and 5% or less.
C: The number of nozzles with a deteriorating deviation of the landing positions was over 5%.

5. 5. Dry Ejection Characteristics

An ink jet-system printer EM-930C (trade name, manufactured by Seiko Epson Corporation) was filled with an ink composition for ink jet recording, and an ejection head was removed from a suctioning cap and allowed to stand for 1 day. After allowing to stand, cleaning was performed once, and continuous printing was performed on 20 pages under ejection from all nozzles to determine the number of nozzles causing printing omission/bending based on the following criteria. The evaluation result "A" or "B" can be determined as "good".

Evaluation Criteria

A: No nozzles causing omission/bending
B: 1 to 5 nozzles causing omission/bending
C: 6 or more nozzles causing omission/bending

TABLE 4

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Varnish solution | Dispersion liquid 1 | 20 | | | | | | | | | | |
| | Dispersion liquid 2 | | 20 | | | | | | | | | |
| | Dispersion liquid 3 | | | 20 | | | | | | | | |
| | Dispersion liquid 4 | | | | 20 | | | | | | | |
| | Dispersion liquid 5 | | | | | 20 | | | | | | |
| | Dispersion liquid 6 | | | | | | 20 | | | | | |
| | Dispersion liquid 7 | | | | | | | 20 | | | | |
| | Dispersion liquid 8 | | | | | | | | 20 | | | |
| | Dispersion liquid 9 | | | | | | | | | 20 | | |
| | Dispersion liquid A | | | | | | | | | | 20 | |
| | Dispersion liquid B | | | | | | | | | | | 20 |
| Surfactant | BYK348 | 0.5 | 0.5 | 0.5 | 0.5 | 0.5 | 0.5 | 0.5 | 0.5 | 0.5 | 0.5 | 0.5 |
| | Olfine E1010 | 0.5 | 0.5 | 0.5 | 0.5 | 0.5 | 0.5 | 0.5 | 0.5 | 0.5 | 0.5 | 0.5 |
| Water-soluble organic solvent | Propylene glycol | 5 | 5 | 5 | 5 | 5 | 5 | 5 | 5 | 5 | 5 | 5 |
| | Triethylene glycol monobutyl ether | 5 | 5 | 5 | 5 | 5 | 5 | 5 | 5 | 5 | 5 | 5 |
| | Glycerin | 7 | 7 | 7 | 7 | 7 | 7 | 7 | 7 | 7 | 7 | 7 |
| | Diethylene glycol | 5 | 5 | 5 | 5 | 5 | 5 | 5 | 5 | 5 | 5 | 5 |
| | Water | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |
| Evaluation | Wettability | B | A | A | A | A | A | A | A | A | C | C |
| | Viscosity | B | B | A | A | A | A | B | A | A | C | B |
| | Re-dispersibility | A | B | A | B | B | A | A | A | A | C | A |
| | Ejection stability | B | A | B | A | A | A | B | A | A | C | B |
| | Dry rejection characteristics | B | B | A | B | A | B | A | B | A | C | B |

BYK-348: Silicone-based surfactant manufactured by BYK Chemie Co., Ltd.
Olfine E1010: Acetylene glycol-based surfactant, manufactured by Nisshin Chemical Industry Co., Ltd.

As described above, it is found that the ink compositions of the examples using the dispersion liquid of the present disclosure have excellent wettability and re-dispersibility, more improved dry ejection characteristics, and excellent ejection stability as compared with the comparative example.

What is claimed is:
1. A dispersion liquid comprising:
   water;
   a coloring material;
   a dispersion resin that disperses the coloring material; and
   a compound having a sulfonate group and a polymerizable group,
   wherein the dispersion resin has a constituent unit A containing a hydrophobic monomer and a constituent unit B containing a monomer having a sulfonate group, the monomer having the sulfonate group containing at least an allylsulfonic acid or a salt thereof;

the weight-average molecular weight of the dispersion resin is 5,000 to 100,000; and the molecular weight of the compound is 300 or less.

2. The dispersion liquid according to claim 1, wherein the content of the compound is 100 to 50000 ppm relative to the total amount of the dispersion liquid.

3. The dispersion liquid according to claim 1, wherein the molecular weight distribution of the dispersion resin is 1.05 to 2.00.

4. The dispersion liquid according to claim 1, wherein the monomer having a sulfonate group contains at least one selected from the group consisting of a vinyl monomer having a sulfonate group, an acrylamide monomer having a sulfonate group, and an acrylic monomer having a sulfonate group.

5. The dispersion liquid according to claim 1, wherein the hydrophobic monomer contains a monomer having an aromatic group or an acrylate ester monomer having a hydrocarbon group.

6. The dispersion liquid according to claim 1, wherein the content of the constituent unit A is 10% to 90% by mass relative to the total amount of the dispersion resin.

7. The dispersion liquid according to claim 1, wherein the content of the constituent unit B is 3% to 70% by mass relative to the total amount of the dispersion resin.

8. The dispersion liquid according to claim 1, wherein the dispersion resin further has a constituent unit C containing a hydrophilic monomer.

9. The dispersion liquid according to claim 8, wherein the hydrophilic monomer contains at least one selected from the group consisting of acrylic acid, methacrylic acid, and 2-hydroxyethyl acrylate.

10. The dispersion liquid according to claim 1, wherein the coloring material is a disperse dye.

11. An ink composition for ink jet recording comprising:

the dispersion liquid according to claim 1;

a surfactant; and a water-soluble organic solvent.

* * * * *